United States Patent [19]

Dürr

[11] Patent Number: 4,662,909

[45] Date of Patent: May 5, 1987

[54] CYCLONE CONSTRUCTION

[75] Inventor: Manfred J. Dürr, Oelde, Fed. Rep. of Germany

[73] Assignee: Krupp Polysius AG, Beckum, Fed. Rep. of Germany

[21] Appl. No.: 776,582

[22] Filed: Sep. 16, 1985

[30] Foreign Application Priority Data

Oct. 9, 1984 [DE] Fed. Rep. of Germany ....... 3437037

[51] Int. Cl.⁴ .............................................. B01D 45/12
[52] U.S. Cl. ....................................... 55/267; 55/345; 55/459 A
[58] Field of Search ..................... 55/267, 269, 459 R, 55/459 A, 459 B, 345, 349

[56] References Cited

U.S. PATENT DOCUMENTS

| 407,598 | 7/1889 | Kutsche | 55/459 A |
| 408,987 | 8/1889 | Morse | 55/459 B |
| 3,212,764 | 10/1965 | Muller et al. | 55/267 X |
| 3,724,176 | 4/1973 | Pavlovich et al. | 55/269 |

FOREIGN PATENT DOCUMENTS 0710647  1/1980  U.S.S.R. ............................ 55/459 B

Primary Examiner—Charles Hart
Attorney, Agent, or Firm—Learman & McCulloch

[57] ABSTRACT

A cyclone separator construction has a gas supply pipe which joins a horizontal inlet spiral of the cyclone and is inclined downwadly at an angle of between 30 degrees and 70 degrees with the horizontal. In this way disruptive material deposits in the inlet region of the cyclone are avoided.

3 Claims, 4 Drawing Figures

CYCLONE CONSTRUCTION

The invention relates to a cyclone construction for use in separating gases and fine materials.

BACKGROUND OF THE INVENTION

In a conventional cyclone separator a gas supply pipe has a horizontal section that opens into the horizontal inlet spiral of the cyclone. Operational experience with such a cyclone has shown that material deposits frequently occur in the horizontal section of the gas supply pipe which joins the inlet spiral of the cyclone, and these deposits greatly restrict the flow of gas. These disruptions are particularly serious in cyclones which are intended for use with hot gases charged with fine material. For example, in cases where the cyclone is the lowest stage of a multi-stage cyclone heat exchanger serving to preheat the fine material, the gas supply pipe is formed by the exhaust gas pipe from a rotary kiln which is connected downstream from the cyclone heat exchanger and serves for final burning of the preheated fine material, and the gas supply pipe which serves as a calciner is provided with an arrangement for supplying additional fuel.

The temperatures of the gas and the material at the inlet to the cyclone encourage particles of material to stick to the relatively cooler walls of the gas supply pipe or of the cyclone. When low-grade fuels are used in the gas supply pipe which serves as a calciner this disadvantageous effect is aggravated because a proportion of these fuels burns out in the cyclone or in the part of the gas supply pipe which opens into the inlet spiral of the cyclone. The material deposits formed during overheating can become so firmly set that they can hardly be removed by conventional means.

The conditions in that part of the gas supply pipe which joins the horizontal inlet spiral of the cyclone and also runs horizontally are particularly unfavorable when the preceding section of the gas supply pipe runs vertically downwards from above. In this case the centrifugal forces coming into effect when the particles of material are deflected from the vertical to the horizontal cause an increased deposit of particles of material in the horizontal part of the gas supply pipe.

The object of the invention, therefore, is to construct a cyclone of the type referred to in such a way that these disadvantages are avoided and disruptive material deposits are prevented from forming in that part of the gas supply pipe which joins the horizontal inlet spiral of the cyclone.

SUMMARY OF THE INVENTION

In a cyclone constructed according to the invention that part of the gas supply pipe which joins the horizontal inlet spiral is inclined downward from above and encloses an angle of between 30 and 70 degrees, preferably between 40 and 60 degrees, with the horizontal, and therefore the deposition of particles of material in this particularly critical part of the gas supply pipe is avoided.

In order to produce the necessary gas inlet cross-section with this inclined inflow into the cyclone, the inclined part of the gas supply pipe advantageously passes partially through the cover of the cyclone.

Comparative measurements show that a cyclone constructed according to the invention gives comparable or somewhat better results as regards degree of separation and pressure loss than a conventional cyclone.

THE DRAWINGS

An embodiment of the invention is illustrated in the drawings, in which.

DETAILED DESCRIPTION

Figure 1:
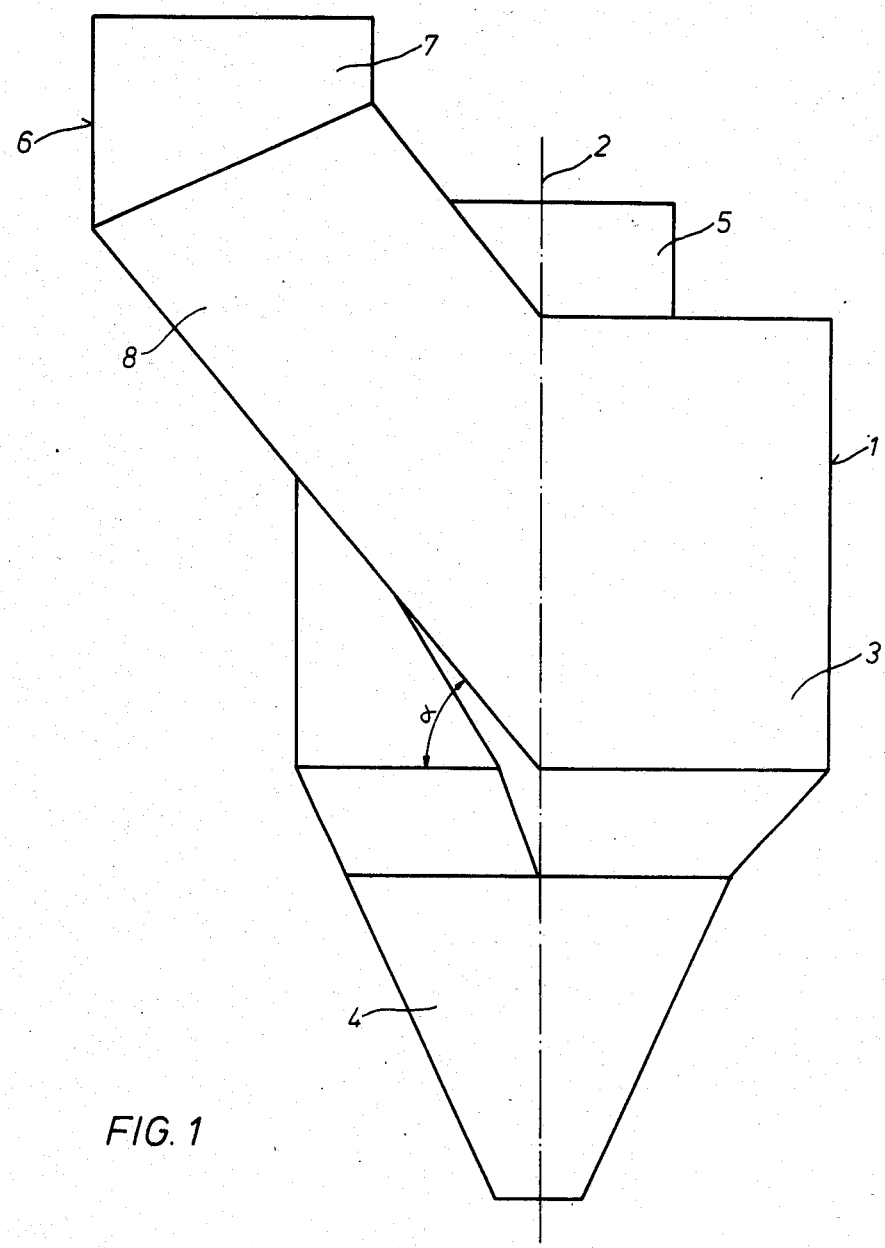
FIG. 1 is a side view of the cyclone.
Figure 2:
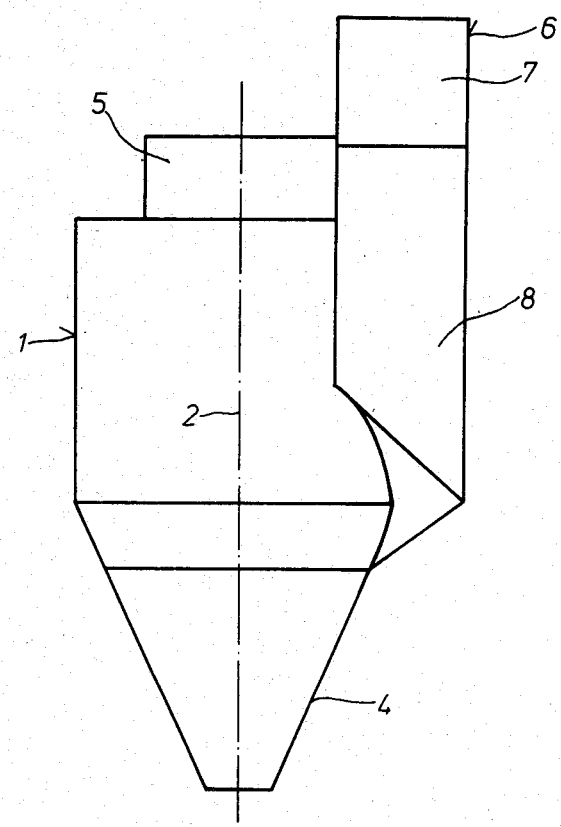
FIG. 2 is a side view rotated 90 degrees with respect to FIG. 1.
Figure 3:
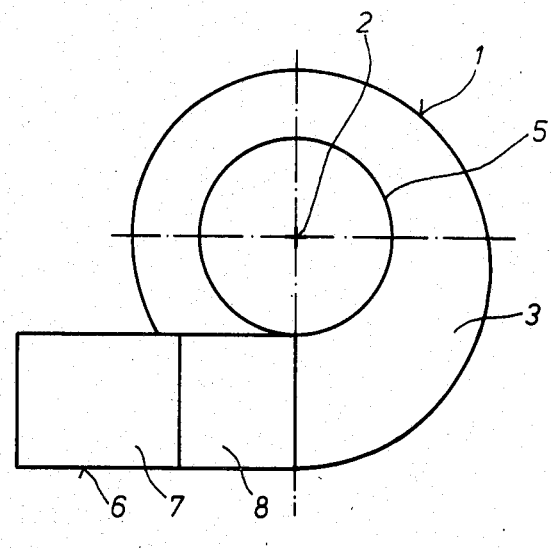
FIG. 3 is a top plan view of the cyclone.

The construction shown in the drawings, comprises a cyclone 1 having a vertical axis 2, a horizontal inlet spiral 3, a separating hopper 4, and a dip pipe 5.

A gas supply pipe 6 which is only partially shown has one section 7 which runs vertically downwards from above and one section 8 which runs downwards at an inclination from above and opens into the horizontal inlet spiral 3, enclosing an angle α between 30 degrees and 70 degrees, and preferably between 40 degrees and 60 degrees, with the horizontal. This pipe part 8 which is inclined downwards from above partially passes through the cover of the cyclone 1 inwardly of the confines thereof in order to ensure the necessary inlet cross-section for the gas. As can be seen from the drawing, in this way part of the pipe part 8 lies immediately adjacent or tangent to the dip pipe 5.

The illustrated cyclone 1 can for example form the lowest stage of a multi-stage cyclone heat exchanger which serves for preheating fine material, and in which the gas supply pipe 6 constitutes the exhaust gas pipe from a rotary kiln which is connected downstream from the cyclone heat exchanger and serves for final burning of the preheated fine material. In this case the gas supply pipe 6 is advantageously constructed as a calciner and provided with at least one burner assembly for supplying additional fuel.

Figure 4:
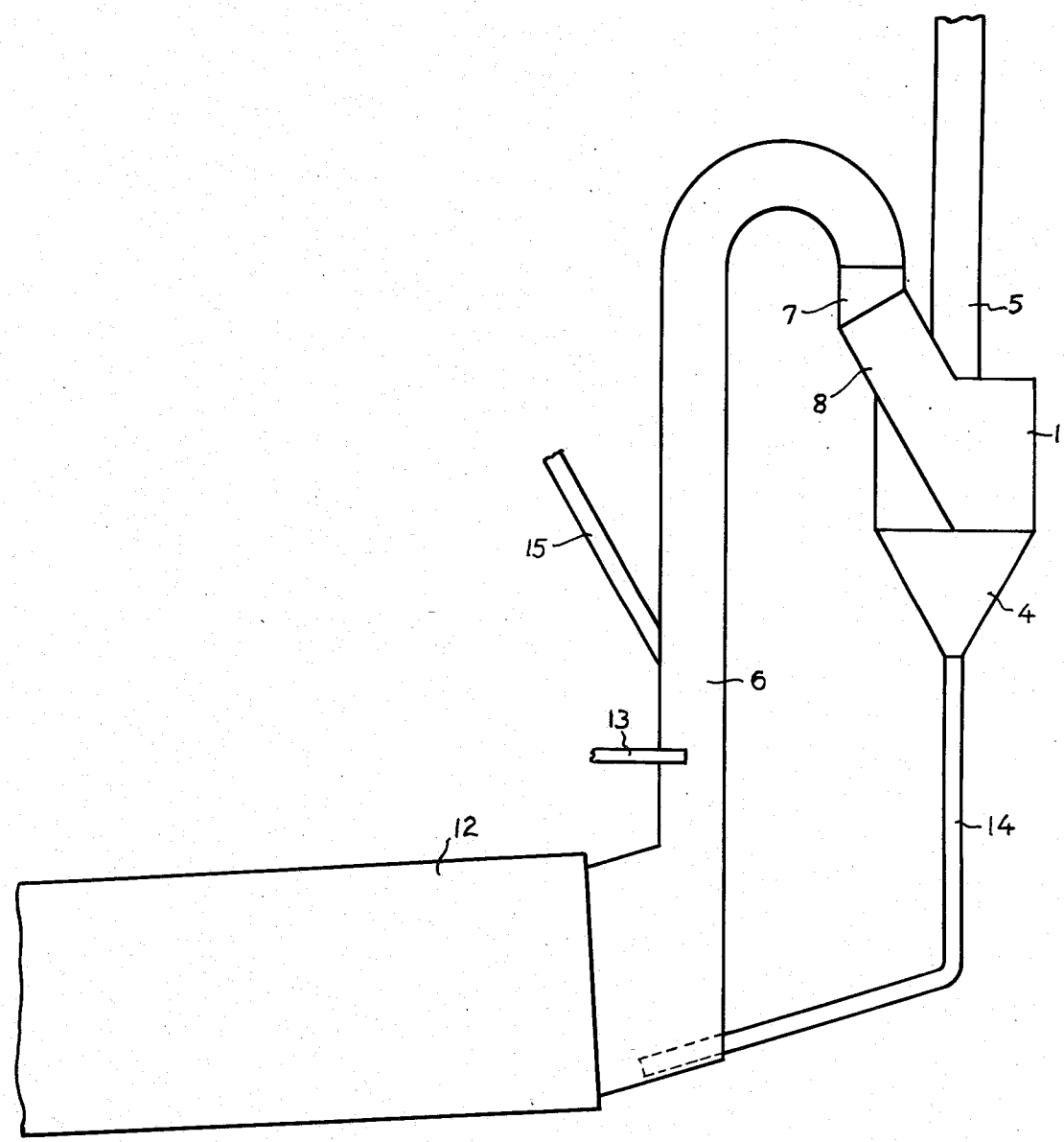
FIG. 4 illustrates a cyclone embodying the present invention in a system wherein a gas supply pipe constructed as a calciner is provided with a burner assembly for supplying additional fuel.

In the diagram of FIG. 4 a cyclone separator 1 is shown wherein the gas pipe 6, formed as the exhaust gas pipe of rotary kiln 12, is provided with a fuel and burner assembly indicated at 13. FIG. 4 also diagrammatically indicates a material pipe 14 (supplying material from cyclone separator 1 to rotary kiln 12), and a material pipe 15 which supplies material from the next cyclone generator, not illustrated, to the gas supply pipe 6.

Since for such an application the temperatures of the gas and the material at the end of the gas supply pipe 6, i.e., at the junction with the cyclone 1, are particularly high and the danger of material caking thereon is therefore very great, it has proved particularly advantageous that material deposits in the inlet zone of the cyclone are avoided to the greatest possible extent as a result of the inclined insertion of the gas supply pipe 6 into the cyclone 1.

I claim:

1. In a cyclone separator for separating hot gases and preheated fine material including:
   (a) a cyclone having a vertical axis and a horizontal inlet spiral; and
   (b) a gas supply pipe for delivering gas and fine material to the inlet spiral of the cyclone, the improvement wherein:

(c) said gas supply pipe is an exhaust gas pipe from a rotary kiln which is downstream from the cyclone, said gas supply pipe having at least one fuel and burner assembly for supplying additional fuel for burning of the preheated fine material;
(d) said gas supply pipe having a downwardly inclined part joined to the horizontal inlet spiral of said cyclone, said downwardly inclined part enclosing an angle of between 30° and 70° with the horizontal; and
(e) said cyclone separator forming the lowest stage of a multi-stage heat exchanger for preheating fine material and having a cover at its top, the lower end of said downwardly inclined part of said gas supply pipe passing partially through said cover, and the upper end thereof being joined to a gas pipe delivery section extending vertically above the part.

2. A cyclone separator according to claim 1 wherein a portion of said gas supply pipe passes through said cover inwardly of the confines of said cyclone.

3. A cyclone separator according to claim 1 wherein said cover has a dip pipe extending therethrough and wherein said gas supply pipe is substantially tangential to said dip pipe.

* * * * *